(12) United States Patent
Barajas et al.

(10) Patent No.: US 6,550,062 B2
(45) Date of Patent: Apr. 15, 2003

(54) SYSTEM AND METHOD FOR LAUNCHING GENERIC DOWNLOAD PROCESSING IN A COMPUTER BUILD-TO-ORDER ENVIRONMENT

(75) Inventors: Gaston M. Barajas, Cedar Park, TX (US); Todd Nix, Austin, TX (US)

(73) Assignee: Dell USA, LP, Round Rock, TX (US)

( * ) Notice: Subject to any disclaimer, the term of this patent is extended or adjusted under 35 U.S.C. 154(b) by 0 days.

(21) Appl. No.: 09/302,609

(22) Filed: Apr. 30, 1999

(65) Prior Publication Data

US 2003/0018965 A1 Jan. 23, 2003

(51) Int. Cl.$^7$ ............................................... G06F 9/44
(52) U.S. Cl. ........................................................ 717/178
(58) Field of Search .................................... 717/11, 178

(56) References Cited

U.S. PATENT DOCUMENTS

| | | | |
|---|---|---|---|
| 4,974,149 A | * 11/1990 | Valenti | 709/217 |
| 5,247,683 A | 9/1993 | Holmes et al. | 717/11 |
| 5,381,534 A | 1/1995 | Shi | 709/203 |
| 5,473,772 A | 12/1995 | Halliwell et al. | 717/11 |
| 5,555,416 A | 9/1996 | Owens et al. | 717/11 |
| 5,625,823 A | * 4/1997 | Debenedictis et al. | 717/6 |
| 5,666,501 A | 9/1997 | Jones et al. | 345/348 |
| 5,717,930 A | 2/1998 | Imai et al. | 717/11 |
| 5,742,829 A | * 4/1998 | Davis et al. | 717/11 |
| 5,768,532 A | 6/1998 | Megerian | 709/245 |
| 5,768,577 A | 6/1998 | Kleewein et al. | 707/10 |
| 5,768,590 A | 6/1998 | Kimura et al. | 717/2 |
| 5,771,381 A | 6/1998 | Jones et al. | 713/100 |
| 6,058,372 A | * 5/2000 | Sweet et al. | 705/16 |

* cited by examiner

Primary Examiner—Kakali Chaki
Assistant Examiner—John Q. Chavis
(74) Attorney, Agent, or Firm—Haynes and Boone, LLP

(57) ABSTRACT

A system and method for installing and/or testing software for a build-to-order computer system having a plurality of components includes a plurality of elements. The computer system has an associated step sequence. The step sequence includes a plurality of steps where each step includes at least one command and a step is associated with a respective software component descriptor. The at least one command can be in more than one computer software language. A software component descriptor corresponds to installing a respective software component on the computer system. The method includes accessing the at least one command within the step sequence; determining a corresponding computer software language associated with the at least one command; executing the at least one command in the corresponding computer software language to install the respective software component; and repeating the accessing, determining and executing for the plurality of steps.

30 Claims, 6 Drawing Sheets

SYSTEM AND METHOD FOR LAUNCHING GENERIC DOWNLOAD PROCESSING IN A COMPUTER BUILD-TO-ORDER ENVIRONMENT

This application relates to co-pending U.S. Pat. No. 5,995,757 issued Nov. 30, 1999, entitled Software Installation And Testing For A Build-To-Order Computer System and naming Richard D. Amberg, Roger W. Wong and Michael A. Brundridge as inventors, the application being incorporated herein by reference in its entirety.

This application relates to co-pending U.S. Pat. No. 5,991,543 issued Nov. 23, 1999, entitled Software Installation And Testing For A Build-To-Order Computer System and naming Richard D. Amberg, Roger W. Wong and Michael A. Brundridge as inventors, the application being incorporated herein by reference in its entirety.

This application relates to co-pending U.S. Pat. No. 5,963,743 issued Oct. 5, 1999, entitled Database For Facilitating Software Installation And Testing For A Build-To-Order Computer System and naming Richard D. Amberg, Roger W. Wong and Michael A. Brundridge as inventors, the application being incorporated herein by reference in its entirety.

BACKGROUND

The disclosures herein are related to build-to-order computer systems and more particularly to a method for installing and testing software for a computer system.

Personal computer systems in general and IBM compatible personal computer systems in particular have attained widespread use for providing computing power to many segments of society. A personal computer system can usually be defined as a desk-top, floor-standing, or portable microcomputer that includes a system unit having a system processor and associated volatile and non-volatile memory, a display monitor, a keyboard, one or more diskette drives, a fixed disk storage device and an optional printer.

It has been known to install software and to perform tests on computer systems before they are shipped to businesses or individual customers. The goal of software installation and testing is to efficiently produce a useful, reliable computer system which may be delivered to businesses and individuals free from errors and ready to run. Software installation often includes loading a desired package of software onto the computer system, preparing appropriate environment variables for the computer, and preparing appropriate initialization files for the loaded software. Software testing often includes making sure that a desired version of software has been installed onto the computer system and that appropriate drivers are present on the computer system.

It has been known in the industry to install software and to test computer systems during manufacture by performing a fixed procedure before they are shipped to customers. For instance, a diskette containing certain diagnostic tests for a certain type of computer system is created. The diskette includes lengthy, often-complicated batch files which direct the software installation and diagnostic processes. The diskette further contains all the executable files for performing tests on the computer system being purchased.

Each computer system being built is provided with a respective copy of this diskette. These diskettes accompany the computer systems being built around a factory floor during the manufacturing process, tests being run on the respective computer system according to the order inherent in the batch file. In the Dell factory, the instructions for software installation are provided in a system descriptor record on these diskettes. A sequencing program then reads the system descriptor record and launches each software installation script.

Currently, the sequencing program reads the system descriptor record and searches for a table file ($PN.TAB) for each software object step to determine which Thompson shell script to launch. This method, while it eliminates the need for top level branching scripts, only allows Thompson shell scripts to be launched. Thompson shell scripts are the only scripting language used in the build-to-order process and are the only scripts the current parser supports. Thompson shell is a non-standard implementation of the Bourne shell and while currently operational, presents limited growth potential. The Thompson shell scripting skill set is not available in the programming market, while other languages are widely accepted and the skill sets are readily available. In addition, common code must be duplicated within many different scripts to perform common tasks such as unzipping files, inserting commands to be run during operating system setup, auditing and error checking.

Therefore, in view of the limitations of past developments, what is needed is a means for allowing other languages to be used in the build-to-order software downloading and testing process.

SUMMARY

Accordingly, one embodiment utilizes a process file in conjunction with a configuration file for the sequencing program that defines commands in the process file. In addition, the table file allows remapping of languages within a single file and removes the need for a software script to determine the language of the OS and which shell to launch. The existence of the table file indicates to the sequencing program that it should launch the Thompson shell scripts from most specific to most general. To this end, a method for installing software for a computer system having a plurality of components, includes an associated step sequence. The step sequence includes a plurality of steps where each step includes at least one command of a plurality of computer software languages. A step is associated with a respective software component descriptor. A software component descriptor corresponds to installing a respective software component on the computer system. The method includes accessing the at least one command within the step sequence; determining a corresponding computer software language associated with the at least one command; executing the at least one command in the corresponding computer software language to install the respective software component; and repeating the accessing, determining and executing for the plurality of steps.

DETAILED DESCRIPTION

A portion of the details of the Dell Computer build-to-order process for computers is described below. Additional details of the entire process are found in the patent applications listed above that are incorporated by reference. Although the preferred embodiment will be described in reference to a specific build-to-order process, the preferred embodiment can be utilized in other environments where software is automatically downloaded to a target computer system.

Figure 1:
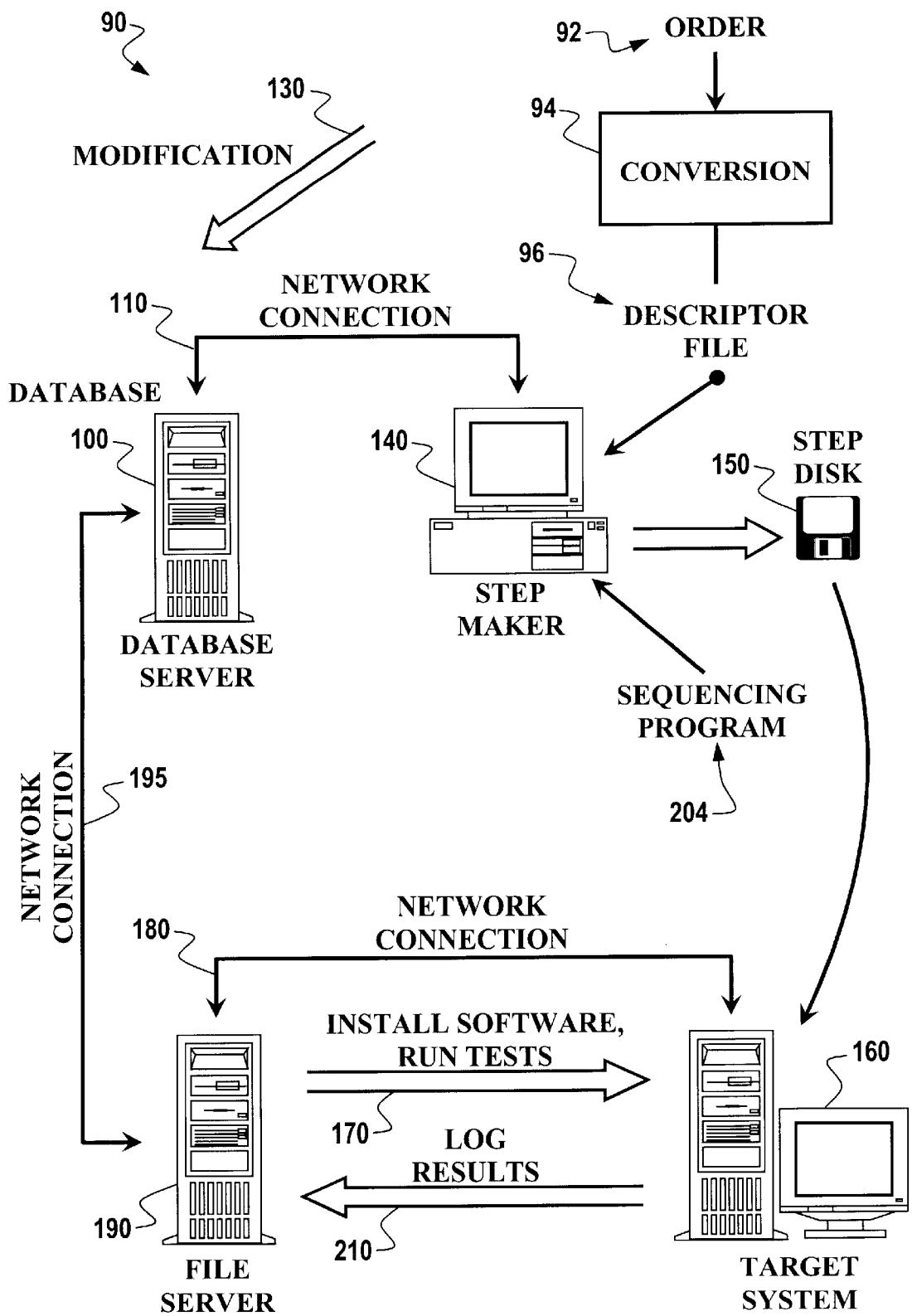
FIG. 1 is a schematic diagram showing software installation and testing.

FIG. 1 is a schematic diagram of software installation and testing system 90. In operation, order 92 is placed to purchase build-to-order target computer system 160. Target system 160 is to be manufactured to contain a plurality of hardware and software components. For example, target system 160 might include a certain brand of hard drive, a particular type of monitor, a certain brand of processor, and a particular version of an operating system. Before target system 160 is shipped to the customer, the plurality of components are installed and tested. Such software installation and testing advantageously ensures a reliable, working computer system which is ready-to-run upon being received.

Because different families of computer systems and different individual computer components require different software installation and testing steps, it is necessary to determine which tests need be run on target system 160 and in what order those tests should be executed so as to achieve an effective software installation and testing process. Step maker 140 is a computer system configured to sequence the software installation and testing steps to be run on target system 160. To sequence the software installation and/or testing steps, step maker 140, and more particularly, sequencing program 204 residing on step maker 140, first reads a plurality of component descriptors from descriptor file 96. Descriptor file 96 is generated when conversion module 94 converts an order 92, which corresponds to a desired computer system having desired components, into a computer readable format (described in more detail herein).

Component descriptors are computer readable descriptions of the components (defined by order 92) of target system 160. A computer readable file called a system descriptor record contains a listing of the component descriptors, hardware and/or software, to be installed onto target system 160. Having read the plurality of component descriptors, sequencing program 204 retrieves a plurality of software installation and/or testing steps that correspond to the component descriptors from database 100 over network connection 110. Network connection 110 may be any network connection well-known in the art, such as a local area network, an intranet, or the Internet. The information contained in database 100 may be updated through a modification depicted by arrow 130.

Having retrieved the software installation and/or testing steps appropriate for target system 160, sequencing program 204 sequences the steps in a predetermined order according to sequence numbers corresponding to each step. Having sequenced the steps required for target system 160, sequencing program 204 writes a series of output files to step disk 150. The output files contain text files having command lines that execute the appropriate software installation and/or testing steps upon target system 160. The software is installed in the predetermined order according to the sequence numbers corresponding to each step. Step disk 150 accompanies target system 160 on the factory floor where the sequencing program runs the tests directly from step disk 150 or, alternatively, from file server 190, connected to target system 160 via network connection 180. Preferably, network connection 180 is a generic network device plugged into a corresponding network port of the target computer system. Following the software installation and testing steps, depicted by arrow 170, the sequencing program logs the results of the installation and tests on the file server 190 over network connection 180.

Figure 2:
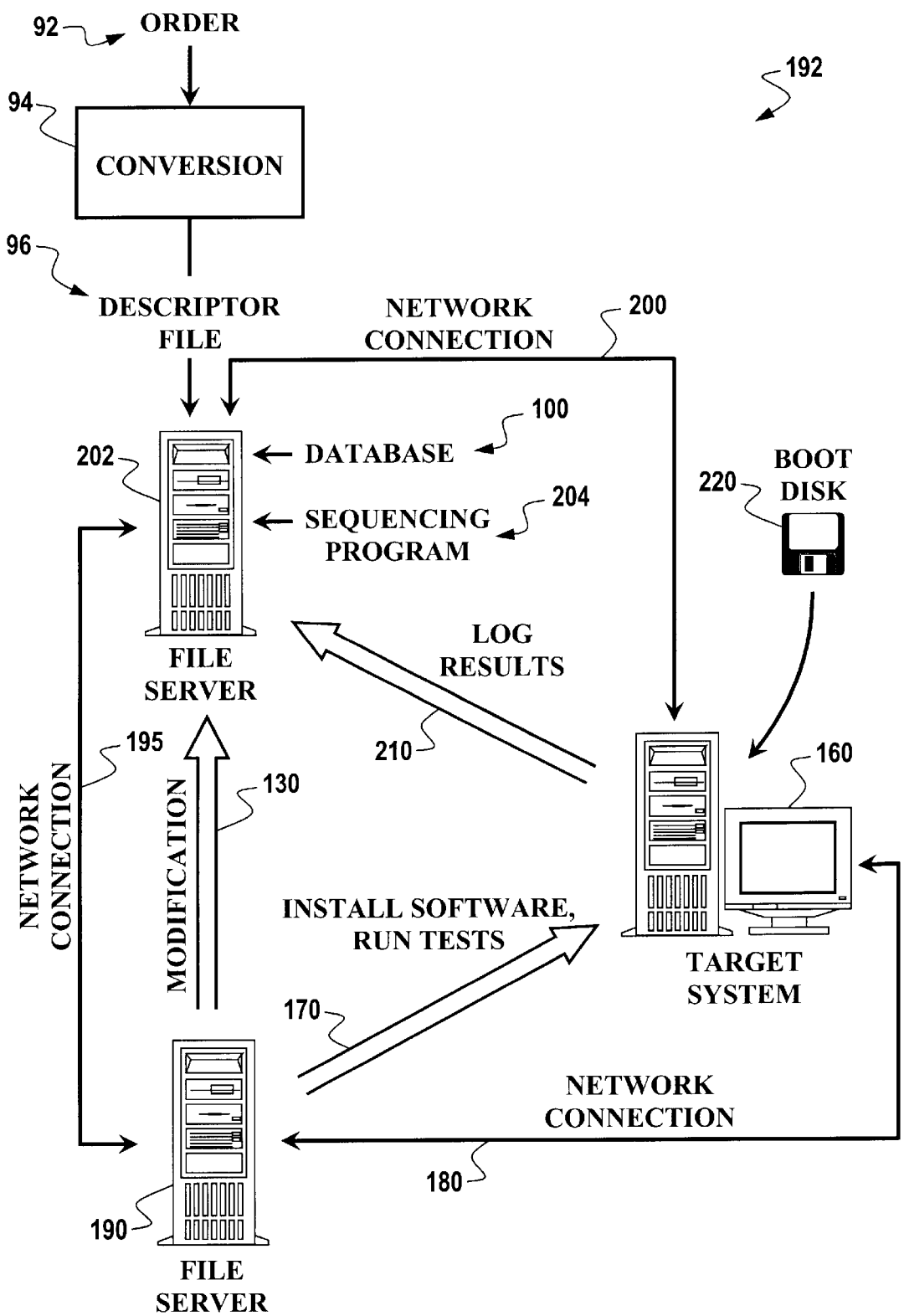
FIG. 2 is a schematic diagram of software installation and testing according to another embodiment.

FIG. 2 is a schematic diagram of software installation and testing system 192 pursuant to another embodiment of the present invention. A customer places order 92 to purchase build-to-order target computer system 160. Target system 160 contains a plurality of components which may include both hardware and/or software components. Before target system 160 is shipped to the customer, the sequencing program 204 installs and tests the plurality of components to ensure a reliable, working computer system which is ready-to-run upon being received by the customer.

To sequence the software installation and testing steps, sequencing program 204 reads a plurality of component descriptors from descriptor file 96. Conversion module 94 converts order 92 into descriptor file 96. Component descriptors are computer readable descriptions of the components of target system 160. A descriptor file includes the component descriptors in a system descriptor record, which is a computer readable file containing a listing of each component, both hardware and software, to be installed onto target system 160. The system descriptor record is stored directly on file server 202. Sequencing program 204 retrieves a plurality of software installation and/or testing steps corresponding to the component descriptors from database 100. Having retrieved the appropriate software installation and/or testing steps for target system 160, sequencing program 204 sequences the steps in a predetermined order according to sequence numbers corresponding to each step. Having sequenced the steps required for target system 160, sequencing program 204 directs the software installation and testing steps upon target system 160, depicted by arrow 170, in the predetermined order via network connections 195 and 180. It is desired that network connection 200 be a generic network device plugged into a corresponding port of target system 160. Network 195 may be any communication connection well-known in the art. Following the software installation and/or testing steps, the sequencing program 204 logs the results of the installation and tests on file server 202 over network connection 200 or stored within an appropriate database. As apparent from the illustration, there is no need for separate step maker computer system 140 of FIG. 1. Additionally, step disk 150 is not necessary. Rather, only boot disk 220, which is configured to boot target system 160, is needed to accompany target system 160 on the factory floor.

Having generally described the software installation and testing systems, attention will now be turned to describing the operation of the systems set forth in FIGS. 1 and 2 in more detail.

Figure 3A:
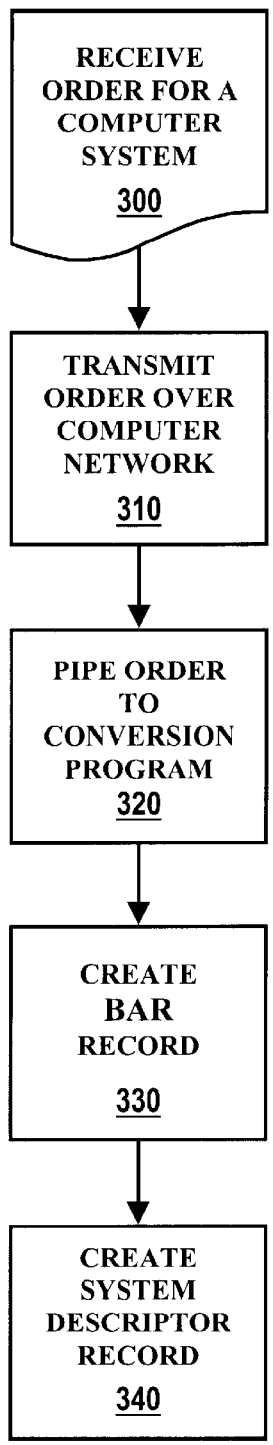
FIG. 3A is a flowchart for converting a computer order into a system descriptor record according to the present disclosure.

FIG. 3A depicts the preferred process in which an order for a computer system is converted into a computer readable system descriptor record. Item 300 represents receipt of an order for a target computer system. This order may be received in many forms. For instance, different ordering formats are possible as well as different order delivery mechanisms. For example, orders for a target computer system may be placed by telephone, by mail, or over computer networks (e.g., over the Internet). Regardless of the means of taking or the form of the order, the order includes the type of target computer system which a customer desires to purchase and, possibly, an explicit listing of the particular components the customer wishes that target computer system to include. After receipt of the order, the build-to-order process passes control to module 310. The process then transmits the target computer system order over a computer network to a manufacturing system (not shown) which produces the order. The process then provides the target computer system order to the software installation and testing system where the process then pipes the order into a conversion program in module 320. The computer network used in module 310 may be of any type well-known in the art. The conversion program then converts the target computer system order to a record useful for the manufacturing process. More specifically, the conversion program converts the computer order first into a record called a Base Assembly Record ("BAR") file at module 330. Preferably, the BAR file contains a unique identifier which identifies the specific target computer system being manufactured. The BAR file also contains a detailed listing of components, which may include both hardware and software, to be included with the target system. Further, it is desired that the BAR file contain manufacturer-specific part numbers or other useful identifiers for each component. Finally, the BAR file may contain customer-specific information such as name, address, and phone number.

Following the creation of the BAR file in module 330, the process then creates the system descriptor record at module 340. A system descriptor record, in the preferred embodiment, is a computer-readable file which is descriptive of the hardware and software components to be included with the target computer system. The system descriptor record contains a list of components of the target system in a format including hardware tags, software tags, information tags, and comments. A hardware tag identifies to sequencing program 204 that information following the tag relates to a hardware component. Similarly, the software tag identifies information following the tag as being related to a software component. The information tag indicates that general information is to follow. Comments allow for various statements to be included into the system descriptor record which are ignored by sequencing program 204. It is desired that the system descriptor record be a text file which is human-readable and easy to understand. Such a file advantageously allows for easy troubleshooting and maintenance of the installation and testing process.

Figure 3B:
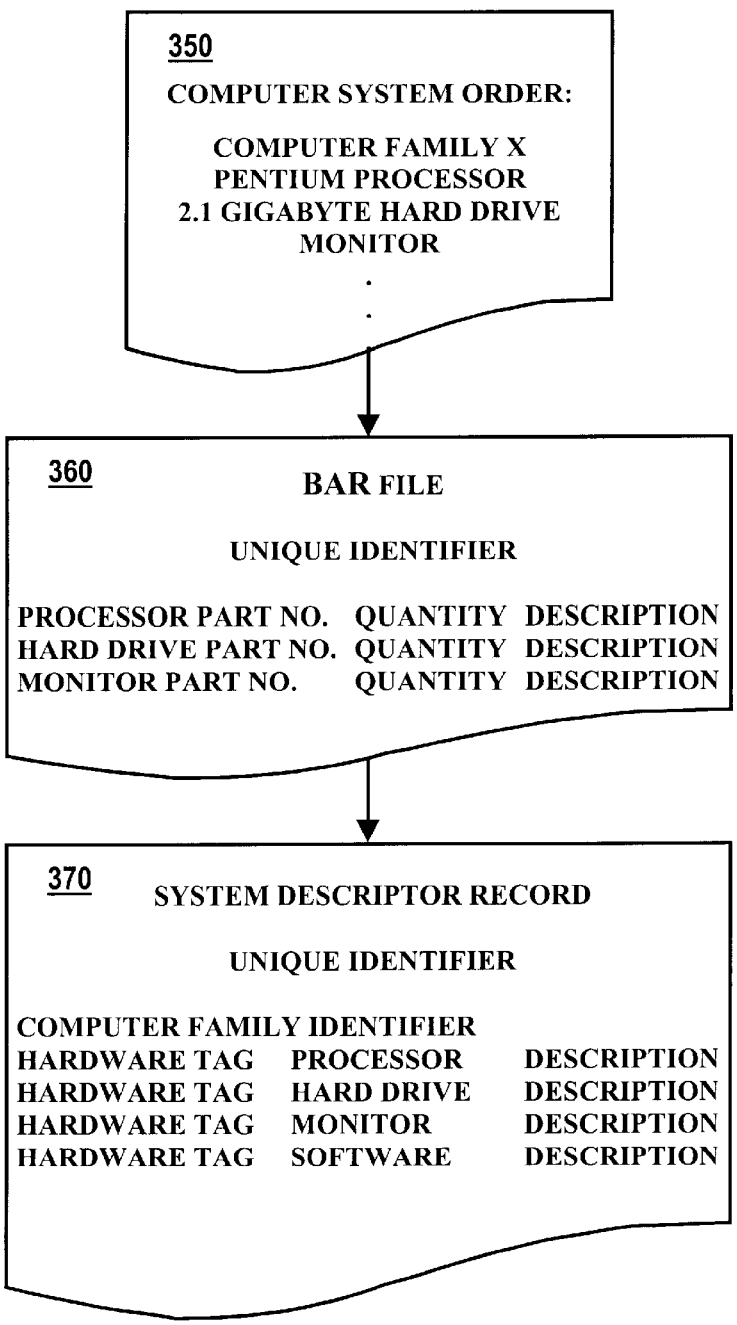
FIG. 3B shows a portion of an example computer order, Base Assembly Record (BAR) file, and system descriptor record.

FIG. 3B shows an example target computer system order 350, a corresponding BAR file 360, and a corresponding system descriptor record 370. Target computer system order 350 contains the name of a computer family, in this illustration, family "X". Also included in target computer system order 350 are three exemplary hardware components including a Pentium® processor, a hard drive, and a monitor. The target computer system order 350 is converted to a BAR file 360 in module 320 of FIG. 3A. BAR file 360 contains a unique identifier for the specific target computer system within family X. BAR file 360 also includes the manufacturer-specific part numbers for each of the components listed in the target computer system order. Further, BAR file 360 contains an identifier indicating the quantity desired of each component as well as a text description of each component to be included on the target computer system. System 90 uses BAR File 360 to create system descriptor record 370.

As illustrated, the system descriptor record 370 also contains the unique identifier for the specific target computer system within family X. Moreover, the system descriptor record 370 contains appropriate tags, here indicating that the processor, hard drive and monitor are all hardware, rather than software, components. The system descriptor record 370 describes those components in a text description. Additionally, the exemplative system descriptor record 370 contains a software tag indicating that certain software should be installed or tested on the target computer system belonging to family X. For example, the software tag might indicate that a certain operating system appropriate for the Pentium® processor always be installed onto the hard drive of the target computer system belonging to family X.

Figure 4:
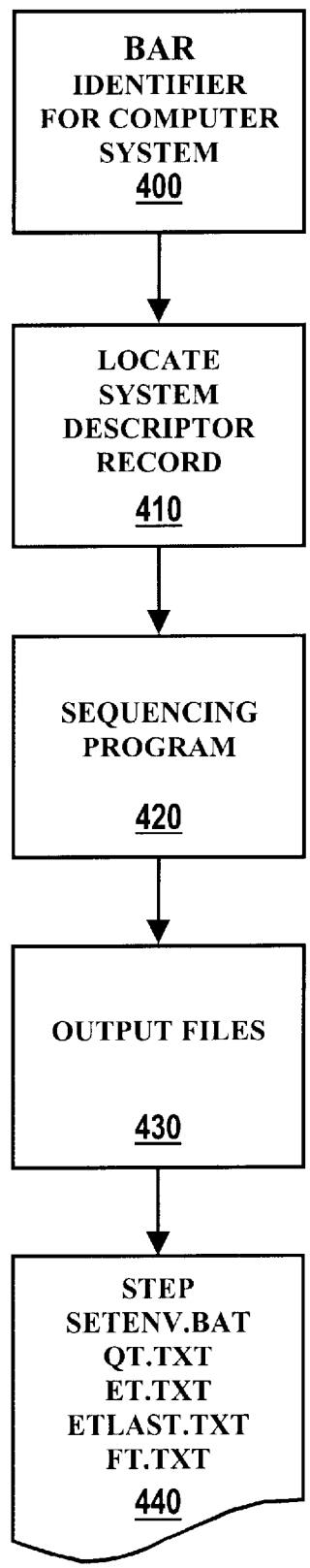
FIG. 4 is a flowchart for creating and providing a step sequence.

In FIG. 4, the preferred general method for sequencing software installation and testing steps is set forth. Module 400 represents the generation of the unique identifier for the target computer system 160. In the embodiment depicted in FIG. 1, a user sitting at step maker computer system 140 generates the unique identifier (e.g., the BAR identifier which functions as a tracking code) for the sequencing program 204 of step maker 140. Alternatively, in the embodiment of FIG. 2, the unique identifier is automatically read into sequencing program 204 after the target computer system order is received.

Module 410 represents the process locating the system descriptor record corresponding to the BAR identifier. In the embodiment of FIG. 1, either network connection 110 or network connection 195 locates the system descriptor record. In the embodiment of FIG. 2, network connection 195 locates the system descriptor record. Module 420 represents the sequencing program reading the system descriptor record. In the FIG. 1 embodiment, the sequencing program resides on step maker computer system 140 while in the FIG. 2 embodiment, the sequencing program resides upon file server 202. Sequencing program 204 works in conjunction with database 100 (of FIGS. 1 and 2) to sequence software installation and testing steps for target computer system 160. The operation of the sequencing program 204 is explained in greater detail below. Once the software installation and testing steps appropriate for the particular target computer system are sequenced, sequencing program 204 produces output files as depicted in module 430.

In the embodiment depicted in FIG. 1, the build-to-order process then writes the output files to step disk 150 (see FIG. 1) in six separate files. Those files are depicted in module 440, FIG. 4, and include (1) a step file, (2) a Setenv.bat file, (3) a Qt.txt file, (4) an Et.txt file, (5) an Etlast.txt, and (6) an Ft.txt file. It is desired that the step file be an ASCII text file including a list of appropriate command lines for executing the software installation and testing steps for the target computer system being ordered. Utilizing the parsing program, the step file also includes commands which may be looped. More specifically, the step file allows commands to be repeated for a defined number or iterations or for a defined length of time. Such a format advantageously allows for software installation or testing steps to be repeated in a calculated, predetermined manner. The Setenv.bat file preferably sets environment variables on the target computer system. It will be appreciated that in a mode of operation, only the Step file and the Setenv.bat file are necessary for installation and testing. The Step file and the Setenv.bat file are ASCII text script files containing a list of appropriate command lines for executing the installation and testing steps for the target computer system. The Qt.txt, Et.txt, Etlast.txt, and Ft.txt files are preferably all ASCII text files containing a list of appropriate command lines for executing the software testing steps for the target computer system in the Quick Test (Qt), Extended Test1 (Et), Extended Test2 (Etlast), and Final Test (Ft) phases of manufacture of the target computer system.

In the embodiment of FIG. 2, on the other hand, output files are not written to a step disk as depicted in FIG. 1. Instead, the output files reside upon file server 202 or file server 190, where they are used to direct the execution of the software installation and/or testing steps upon target computer system 160.

Figure 5:
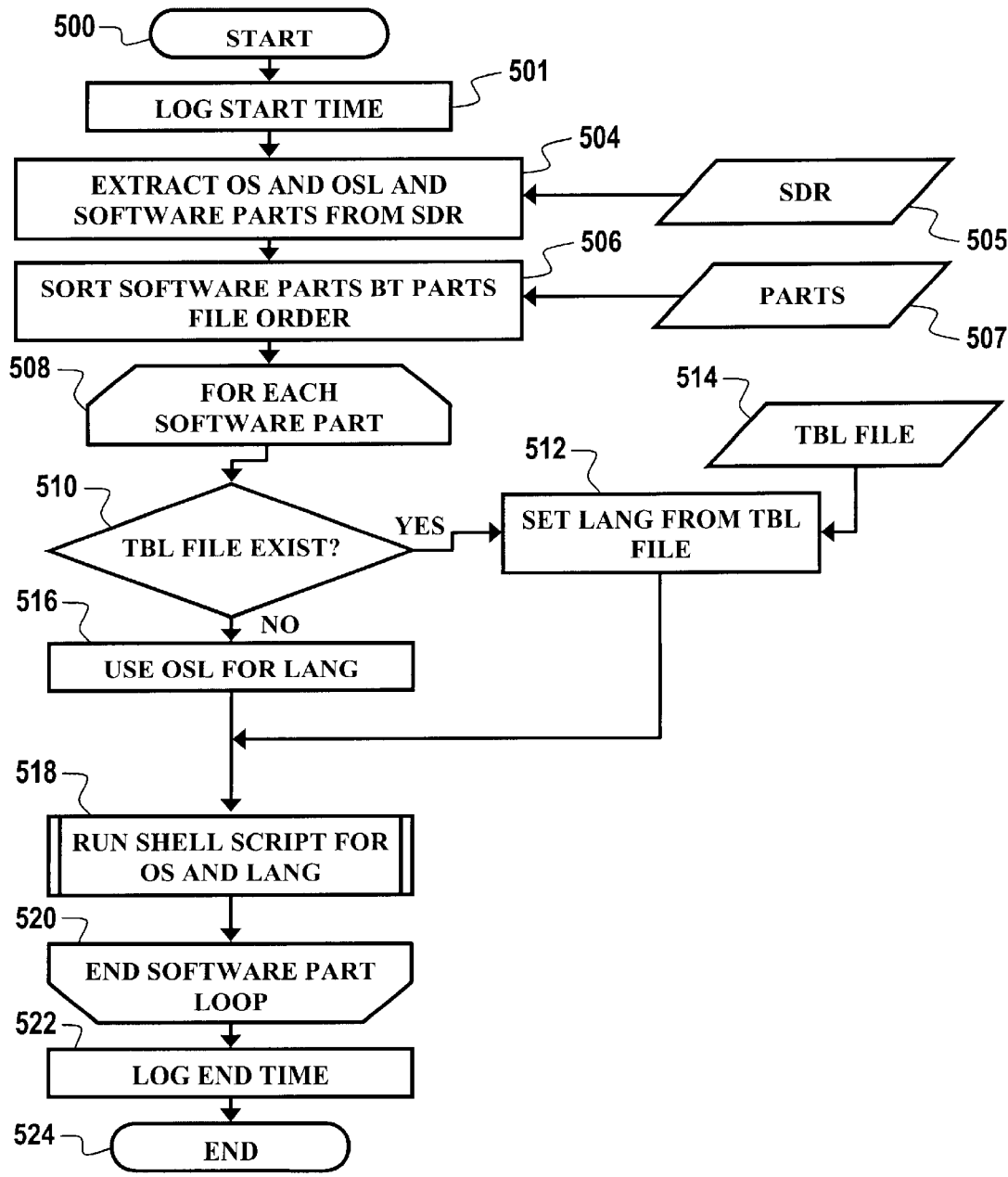
FIG. 5 is a detailed flowchart of the old parsing program.

Now, particular emphasis will be placed on the software object steps in the step files and the present disclosure which parses those step files. FIG. 5 depicts a flowchart of the old version of the parsing program. Module 500 designates the start of the parsing program. Then, the parsing program logs the start time and parses the command line in module 501. In module 504, the parsing program extracts the software component descriptors, the operating system type (OS) and operating system language (OSL) variables from the system descriptor record. The parsing program then downloads the software component descriptors to the download list from the software component descriptors database 507 and then sorts them by software component descriptors order in module 506. Each software part describes a particular type of software to be downloaded to the target computer system.

A loop process for each software part then begins at module 508. The parsing program checks to see if a table file exists for that software part in module 510. If a table file exists, parsing program then sets the LANG variable from the table file 514 in module 512. If no table file exists, the parsing program then sets the LANG variable to the OSL variable in module 516. The parser then runs the shell script for the current OS and LANG variables in module 518. A parser then checks to see if there are any more software component descriptors in module 520. If there are more software component descriptors, then the parsing program starts over at module 508. If there are no more software component descriptors, the parsing program logs the end time and the elapsed time in module 522 and ends the process in module 524.

The old parsing program described in FIG. 5 only allows for one programming language to be used in the software scripts. In contrast, the new parsing program utilizes a configuration file (Parser.CFG) and a table file. However, this table file also allows remapping of languages within a single file and removes the need for the software script to determine the language of the OS and which shell to launch. The existence of the table file would indicate to the parsing program that it should launch the Thompson shell scripts from most specific to most general.

The build-to-order process creates a process file ($PN.PRO) to eliminate the duplication of common code, to speed up the development process, and free the parsing program from its strictly bound Thompson shell script only support. The process file acts as the basic structure for simple scripts and allow for the launching of more complex scripts in almost any scripting language.

The new parsing program now searches for and interprets the $PN.PRO file. The existence of the process file indicates that process redirection is to occur. Sections within the process file provide process calls for each specific language ($LANG), operating system ($OS), line of business ($LOB), and region ($MFGSITE). The parsing program supports all combinations of these four variables. In addition, the parser allows for the addition of more variables at any time. The section names are comprised of the combination of variables and indicate a list of processes to run for that combination.

The parser searches for the most specific section that matches the environment to the least specific. If a match is not found, the parser produces an error and stops the download process. The parsing program supports the following format for the section names: PROCESS.LANG.OS.LOB.REGION. The parsing program also supports wildcards in any position except the first and should be specified by using an * in the place holder. All section name components are positional and the component order must be strictly maintained.

The entries within each section specify predefined processes with their respective parameters. In addition, the parser runs the entries in the sequence listed in that section. The processes are defined in a configuration file (Parser.CFG) for the sequencing program 204 and are generic as to not require modification on a object by object basis.

The following lists examples of predefined processes:

| | |
|---|---|
| SH | Thompson Shell Script. |
| PL | Perl script. |
| WBI | Windows Based Installation executable to be run within the OS. |
| RO | Run once item to be run once during OS setup. |
| RUN | Executable to be run immediately, DOS support initially. |
| UNZIP | PKZip files to be unzipped with file specification passed as a parameter. |

All processes support additional parameters, such as a file specification, a fully pathed executable or a registry string.

Figure 6:
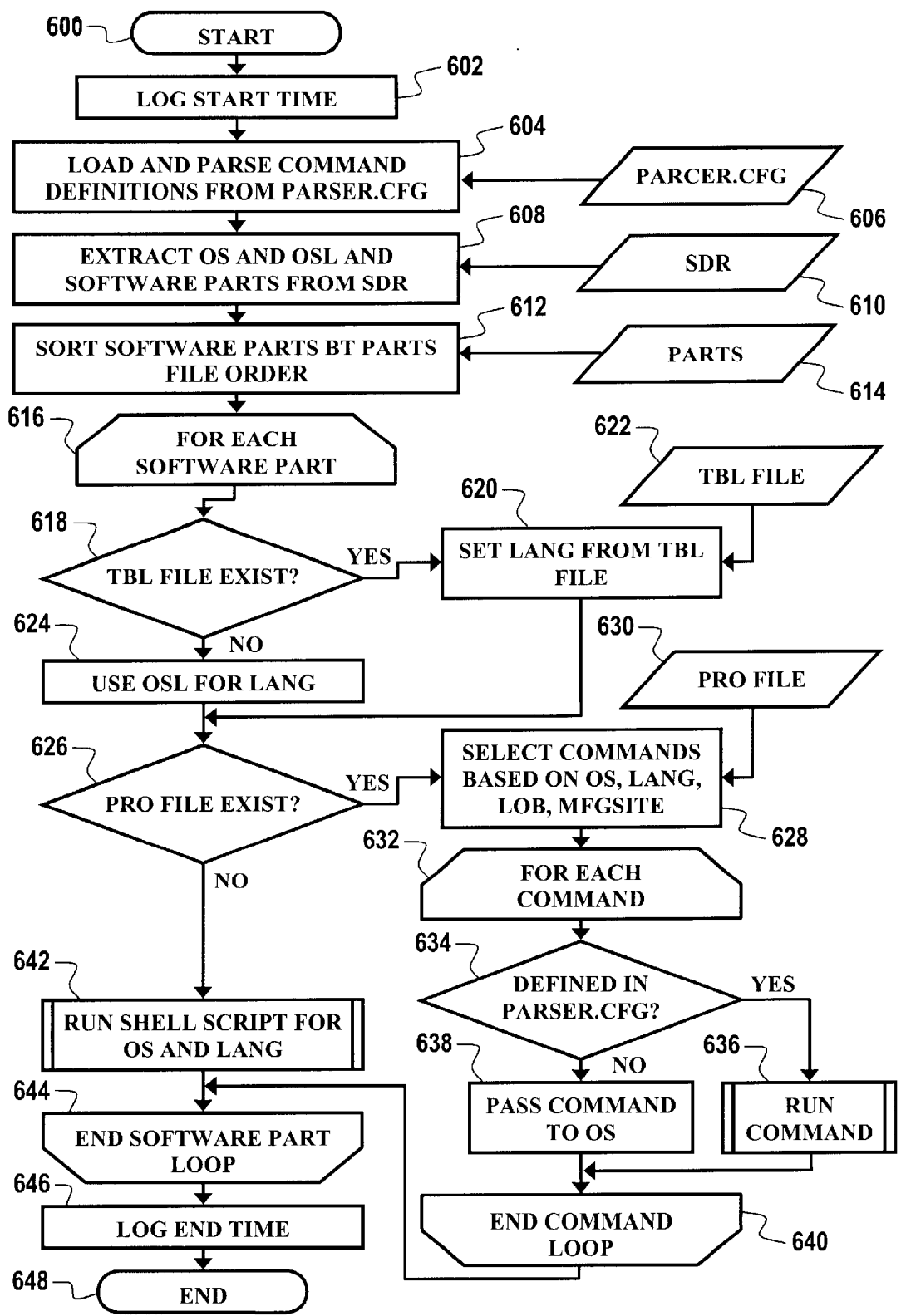
FIG. 6 is a flowchart of the new parsing program.

Referring now to FIG. 6, the parser starts in module 600. The parser logs the start time in module 602. The parsing program loads the configuration program (Parser.CFG) 606 and then parses the file for the command definitions in module 604. In module 608, the parser then extracts the software component descriptors, the operating system type (OS) and operating system language (OSL) variables from the system descriptor record 610. The parser then downloads the software component descriptors to the download list from the software component descriptors database 614 and then sorts them by software component descriptors order in module 612. Each software part describes a particular type of software to be downloaded to the target computer system.

A loop process for each software part begins at module 616. The parsing program checks to see if a table file exists for that software part in module 618. If a table file does exist, the parser sets the LANG variable from the table file 622 in module 620. If no table file exists, the parser sets the LANG variable to the OSL variable in module 624.

The parsing program checks to see if a process file exists in module 626. If one exists, the program retrieves all the commands from the process file 630 according to the set OS, LANG, LOB and MFGSITE variables in module 628. A loop is then started for each command in module 632. The parser checks to see if the command is defined in the parser configuration file in module 634. If the command is defined, the parser expands and runs the command in module 636. If the command is not defined, the parser passes the command to the operating system in module 638. The parser checks to see if there are any more commands in module 640 and returns to module 632 if there are more commands.

If the process file does not exist, the parser runs the shell script for the OS and LANG variables in module 642. Module 644 checks to see if there are any more software component descriptors, and returns to module 616 if there are more software component descriptors. Once there are no more software component descriptors, the parser logs the ending time in module 646 and terminates in module 648.

Upon completion of the parsing program installing all the software component descriptors, the build-to-order process tests the target system. In the embodiment of FIG. 1, a select number of tests may be run directly from step disk 150, but the majority of tests are run from file server 190 over network connection 180. Running tests from file server 190 advantageously eliminates limitations imposed by the storage capacities of floppy disks such as step disk 150.

In the embodiment of FIG. 2, the build-to-order process runs tests from file server 190 over network connection 180. A floppy disk, here boot disk 220, is needed only to boot target computer system 160. Such a system advantageously simplifies the software installation and testing process.

Turning once again to FIGS. 1 and 2, arrow 210 depicts the process logging results from the software installation and testing on either file server 190 or to file server 202. The results preferably include whether all the steps were completed successfully and what types of failures (if any) were encountered. Logging the results might include simply saving or writing a modified version of the step file following the execution of the step sequence, for as discussed above, the step file is time stamped by the Runstep program. Such a system advantageously allows for improved troubleshooting capabilities during computer system manufacturing.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

Detailed below is a sample process file (12345.PRO), an example parser.cfg, and a flowchart to illustrate the process and its inputs. The sample process files are for the purpose of showing structure and process calls and are only examples of an implementation of the embodiments disclosed herein.

12345.PRO (Example)
; Default section allows an no match condition to fallback to Thompson
; support. Without this section all no match conditions would end the
; download process.

```
[PROCESS]
SH
```

; Process block for English, Window98, all LOBS, all Regions
; This block calls the RO process as defined in parser.cfg and inserts
; the computer name, FN713 into the registry and specifies that a Perl
; script is to be searched for and run.

```
[PROCESS.ENG.W98.*.*]
RO "HKLM,software\currentcontrolset\services\vxd\vnetsup,,FN713"
PL
```

; Process block for Traditional Chinese, Window98, Dimension, APCC
; This block calls the RO process as defined in parser.cfg to set
; the keyboard to 106 and specifies that a Thompson script is to be
searched for and run.

```
[PROCESS.CHT.W98.DIM.APC]
RO "HKLM,software\currentcontrolset\services\keyboard,,106"
SH
```

; Process block for All Languages, Window95, all LOBS, all Regions
; This block calls the UNZIP process as defined in parser.cfg passing
; it the filespec of the zips to be processed. It then calls the WBI
; process as defined in parser.cfg passing it the command line
; parameter to launch a Windows based installation of a software
;package.

```
[PROCESS.*.W95.*.*]
UNZIP ${PN}_*.${ZIP_EXT}
UNZIP BITMAPS.ZIP
WBI "C:\PROGRAM FILES\OFFICE\SETUP.EXE/U"
```

PARSER.CFG (Excerpt of File)
; This block defines how the parser should search a PRO file for a
matching block.
[PROCESS]
SEARCH=$LANG.$OS.$LOB.$MFGSITE; $LANG.$OS.$LOB; $LANG.$OS; $LANG
; This is an example of a process used to implement an alternative
; scripting language. It will search for a matching file and launch
; that file using the Perl interpreter
[PL]
EXE=perl.exe
SEARCH=$PN$LANG.$OS; $PN$OS.PL; $PN$LANG.PL; $PN.PL
; This is an example of a process used to simplify the unzipping
; process. This provides a maintenance point and standardized unzip
; calls. In this example unzip.pl is a Perl script that will unzip the
; filespec passed by the process file.
[UNZIP]
perl unzip.pl %1
; This is an example of a process used to simplify the installation of
; software under the operating system. In this example wbi.sh is a
; Thompson shell script that will insert the command line parameter
; passed by the process file into the OS to launch the installation.
[WBI]
sh wbi.sh %1
; This is an example of a process used to run a executable or batch
; file during the build-to-order process. It will run the passes ; parameter under a command shell and return to the process.
[RUN]
a:\command.com/c %1
FAIL

What is claimed is:

1. A method of software installation for a computer system having a plurality of components, the computer system having an associated step sequence, the step sequence including a plurality of steps, each step including at least one command of a plurality of computer software languages, a step being associated with a respective software component descriptor which corresponds to installing a respective software component on the computer system, the method comprising:

accessing the at least one command within the step sequence;

creating a process file to allow for launching complex scripts in multiple scripting languages and provide for the computer software languages;

determining a corresponding computer software language associated with the at least one command;

executing the at least one command in the corresponding computer software language to install the respective software component; and repeating the accessing, determining and executing.

2. The method of claim 1 further including:

creating a beginning time stamp indicating when the execution of the command began; and creating an ending time stamp indicating when the execution of the command ended.

3. The method of claim 1 wherein the computer software language of the command is Perl™.

4. The method of claim 1 wherein the command is a Windows™ Based Installation executable.

5. The method of claim 1 wherein the command is a PKZip™ file to be unzipped with a file specification passed as a parameter.

6. The method of claim 1 wherein the command is a batch file and at least one parameter is passed to the batch file.

7. The method of claim 1 wherein the command is an executable file and at least one parameter is passed to the executable file.

8. The method of claim 1 further including reading a configuration file defining specific commands according to specific computer software languages and interpreters.

9. The method of claim 1 wherein the determining step further includes reading a process file defining specific environments with corresponding commands.

10. The method of claim 1 wherein the accessing at least one command further includes selecting the at least one command based on operating system, operating system language, line of business, and manufacturing site of the computer system.

11. A method of software installation for a computer system having a plurality of components, the computer system having an associated step sequence, the step sequence including a plurality of steps, each step including at least one command of a plurality of computer software languages, a step being associated with a respective software component descriptor which corresponds to installing a respective software component on the computer system, the method comprising:

reading a configuration file defining specific commands according to specific computer software languages and interpreters;

accessing the at least one command within the step sequence;

creating a process file to allow for launching complex scripts in multiple scripting languages and provide for the computer software languages;

determining a corresponding computer software language associated with the at least one command;

executing the at least one command in the corresponding computer software language to install the respective software component; and repeating the accessing, determining and executing.

12. The method of claim 11 further including:

creating a beginning time stamp indicating when the execution of the command began; and creating an ending time stamp indicating when the execution of the command ended.

13. The method of claim 11 wherein the computer software language of the command is Perl™.

14. The method of claim 11 wherein the command is a Windows™ Based Installation executable.

15. The method of claim 11 wherein the command is a PKZip™ file to be unzipped with a file specification passed as a parameter.

16. The method of claim 11 wherein the command is a batch file and at least one parameter is passed to the batch file.

17. The method of claim 11 wherein the command is an executable file and at least one parameter is passed to the executable file.

18. The method of claim 11 wherein the determining step further includes reading a process file defining specific environments with corresponding commands.

19. The method of claim 11 wherein the accessing at least one command further includes selecting the at least one command based on operating system, operating system language, line of business, and manufacturing site of the computer system.

20. A method of software installation for a computer system having a plurality of components, the computer system having an associated step sequence, the step sequence including a plurality of steps, each step including at least one command of a plurality of computer software languages, a step being associated with a respective software component descriptor which corresponds to installing a respective software component on the computer system, the method comprising:

reading a configuration file defining specific commands according to specific computer software languages and interpreters;

reading a process file defining specific environments with corresponding commands;

accessing the at least one command within the step sequence;

creating a process file to allow for launching complex scripts in multiple scripting languages and provide for the computer software languages;

determining a corresponding computer software language associated with the at least one command;

executing the at least one command in the corresponding computer software language to install the respective software component; and repeating the accessing, determining and executing.

21. A system of computer programs stored on a storage medium for software installation for a computer system having a plurality of components, the computer system having an associated step sequence, the step sequence including a plurality of steps, each step including at least one command of a plurality of computer software languages, a step being associated with a respective software component descriptor which corresponds to installing a respective software component on the computer system, the system comprising:

instructions for accessing the at least one command within the step sequence;

instructions for creating a process file to allow for launching complex scripts in multiple scripting languages and provide for the computer software languages;

instructions for determining a corresponding computer software language associated with the at least one command;

instructions for executing the at least one command in the corresponding computer software language to install the respective software component; and instructions for repeating the accessing, determining and executing.

22. The system of claim 21 further including:

instructions for creating a beginning time stamp indicating when the execution of the command began; and instructions for creating an ending time stamp indicating when the execution of the command ended.

23. The system of claim 21 wherein the computer software language of the command is Perl™.

24. The system of claim 21 wherein the command is a Windows™ Based Installation executable.

25. The system of claim 21 wherein the command is a PKZip™ file to be unzipped with a file specification passed as a parameter.

26. The system of claim 21 wherein the command is a batch file and at least one parameter is passed to the batch file.

27. The system of claim 21 wherein the command is an executable file and at least one parameter is passed to the executable file.

28. The system of claim 21 further including instructions for reading a configuration file defining specific commands according to specific computer software languages and interpreters.

29. The system of claim 21 wherein the instructions for determining further includes instructions for reading a process file defining specific environments with corresponding commands.

30. The system of claim 21 wherein the instructions for accessing at least one command further includes instructions for selecting the at least one command based on operating system, operating system language, line of business, and manufacturing site of the computer system.

* * * * *